United States Patent [19]

Rice

[11] 4,221,596
[45] Sep. 9, 1980

[54] METHOD FOR LOW PRESSURE FORMING OF FUSED SILICA COMPOSITIONS AND RESULTANT BODIES

[75] Inventor: Hal H. Rice, Birmingham, Mich.

[73] Assignee: General Motors Corporation, Detroit, Mich.

[21] Appl. No.: 729,000

[22] Filed: Oct. 4, 1976

[51] Int. Cl.$^2$ .............................................. C04B 35/14
[52] U.S. Cl. ........................................ 106/69; 264/63
[58] Field of Search ............... 106/40, 68, 69; 264/56, 264/63

[56] References Cited

U.S. PATENT DOCUMENTS

| | | | |
|---|---|---|---|
| 3,389,001 | 6/1968 | Blackburn et al. | 106/40 |
| 3,770,867 | 11/1973 | Criss et al. | 106/204 |
| 3,791,835 | 2/1974 | Carini et al. | 106/68 |
| 3,963,504 | 6/1976 | Lundsager | 264/63 |

OTHER PUBLICATIONS

Scholes, *Modern Glass Practice*, pp. 251–255, 1951.

*Primary Examiner*—John A. Parrish
*Attorney, Agent, or Firm*—S. Carter

[57] ABSTRACT

A method for forming contoured refractory bodies characterized by a low coefficient of expansion, high flexural strength and resistance to thermal shock, wherein a fused silica material is pressed into the desired shape in a porous die at a pressure not greater than about 1500 psi, the batch composition consisting essentially of from about 70–85 parts by weight fused silica of −325 mesh, from about 15–30 parts by weight clay, together with from about 20–28 parts by weight de-ionized water and from about 0.1–0.6 parts by weight of at least one of the organic plasticizers selected from the group consisting of hydroxyethyl cellulose, hydroxypropyl cellulose, ethylene oxide resin and propylene glycol alginate, the composition containing less than 0.3% by weight on an after-fired basis of alkali and alkaline earth metal oxides, the green body being dried and then fired at about 1123° C. for about 6 hours.

10 Claims, No Drawings

METHOD FOR LOW PRESSURE FORMING OF FUSED SILICA COMPOSITIONS AND RESULTANT BODIES

BACKGROUND OF THE INVENTION

Heretofore, fused silica has been used to form refractory ceramic components requiring high dimensional stability, low thermal expansion and good strength retention properties, such components as blow pipe liners, runners for iron blast furnaces, and furnace lining and brick being well known applications. The common method for forming such components is thixotropic casting or slip casting in which the fused silica is formed into a slip which is poured into forming molds followed by drying and high temperature firing. This method is suitable for low volume production but not where high volume is required.

Typical of such applications is the composition and method disclosed in U.S. Pat. No. 3,488,723 issued to F. M. Veazie Jan. 6, 1970 covering the formation of a combination manifold-muffler liner. The patentee here discloses the use of a coarse grained mixture of fused silica and glass together with bentonite and water for pressing or casting to a desired shape. The patentee does not disclose or teach the need for controlling alkali and alkaline earth content for preservation of the low coefficient of thermal expansion but instead teaches the manipulation of grain size using materials having a coefficient as high as $6 \times 10^{-6}/C°$ and uses a soda-lime glass as a binder.

The patent to G. H. Criss U.S. Pat. No. 3,770,867 issued Nov. 6, 1973 discloses the use of coarse grained fused silica together with volatilized silica and a plasticizing organic binder to enable extrusion of the mixture, the amounts of organic binder varying from 0.25 to about 3% by weight and the volatilized silica from about 1–15% by weight, the desired shapes being formed as the extrudate.

With reference to the limitation of the amount of total alkali and alkaline earth content, the patent of G. F. Carini et al U.S. Pat. No. 3,791,835 issued Feb. 12, 1974 discloses a mixture comprised principally of quartz (crystalline) wherein the total alkali metals content is limited to 0.2% by weight. Similarly, the patent to I. M. Lachman et al U.S. Pat. No. 3,885,977 issued May 27, 1975 discloses the limitation of the amount of alkali metal content to less than 0.4% by weight and the calcium content to less than 0.1% by weight, the composition being cordierite having anisotropic crystal orientation. In each of these disclosures, the patentee is attempting to prevent crystalline materials from transforming.

SUMMARY OF THE INVENTION

According to my invention it has been discovered that fine grained fused silica can be rendered readily extrudable to form a batch charge for a low pressure porous die press from which a green body formed in the desired contoured shape is readily removed for drying and firing, the resulting body retaining the low coefficient of thermal expansion inherent in the use of fused silica while at the same time having high flexural strength and resistance to thermal shock. The compositions and method of my invention also lends itself to the economic production of high volume usage parts such as liners for automotive exhaust manifolds such as is exemplified in U.S. Pat. No. 3,798,903 issued Mar. 26, 1974 to H. R. Mitchell et al. More particularly, I have found that compositions consisting essentially of from about 70–85 parts by weight fused silica of −325 mesh, from about 15–30 parts by weight clay, together with from about 20–28 parts by weight de-ionized water and from about 0.1–0.6 parts by weight of at least one of the organic plasticizers selected from the group consisting of hydroxyethyl cellulose, hydroxypropyl cellulose, ethylene oxide resin and propylene glycol alginate, the composition containing less than 0.3% by weight of an after-fired basis of alkali and alkaline earth metal oxides are suitable for low pressure forming in porous dies at pressures not in excess of about 1500 psi.

Accordingly, it is an object of my invention to provide a method for producing fine grained fused silica contoured shapes by pressing at low pressures in a porous die. It is also an object of my invention to provide fused silica contoured bodies having a low coefficient of thermal expansion, high flexural strength and high resistance to thermal shock. These and other objects of my invention will be apparent from the description which follows.

The low coefficient of thermal expansion for fused silica, $0.3–0.45 \times 10^{-6}/°F$. from $0°–1832°$ F., has made this material desirable in compositions requiring high thermal stability and shock resistance. However, in view of the total lack of plasticity its use has been limited to slip casting and mold packing techniques which do not lend themselves to high volume production requirements. I have found that by using the formulations for the batch material and the low pressure porous mold pressing techniques known in the art, high volume production of dense, fine grained fused silica bodies for applications such as liners in exhaust manifolds may be economically and efficiently achieved.

More particularly, this disclosure covers improved compositions containing fused silica which can be used to economically produce exhaust manifold liners for thermal reactors such as disclosed in U.S. Pat. No. 3,798,903.

The material described herein is improved in regard to certain physical characteristics as well as having capability to be formed economically by a high output wet pressing method.

The Ram process, described in the patent to Blackburn et al, U.S. Pat. No. 3,389,001 issued June 18, 1968, is a wet forming porous die method by which irregular shaped ceramic parts can be made on small tonnage presses, e.g., 100 tons and less, with inexpensive tooling, and thus, is attractive for high volume production of manifold reactor liners with low capital equipment investment. In the Ram procedure, wet, extruded blanks of ceramic material are pressed to shape in permeable dies (plaster or ceramic). These dies incorporate air ducts so that the pressed part is released by application of air which forces water and air from the permeable die against the piece, thus disengaging the piece from the die.

Heretofore, the Ram process has been utilized to press conventional triaxial compositions (flint-feldspar-clay) in which the clays by virtue of their plasticity provide the necessary workability in the materials and, in rare instances, to form parts from certain nonplastic materials, e.g., boron carbide, plasticized with sodium alginate. Since conventional ceramic fused silica is made by slip casting and is a nonplastic material that does not contain clay and cannot be plasticized with materials containing sodium or other alkali or alkaline earth metal oxides (alkali and alkaline earth ions inhibit densification, impair strength and promote development of crystalline material (cristobalite) in amorphous fused silica, cristobalite causing substantial thermal expansion and impairs thermal shock resistance), it has been necessary to develop suitably plasticized ceramic fused silica compositions to enable this type material to be formed to shape economically by wet pressing techniques such as the Ram process.

glycol, plasticize ceramic fused silica so that after mixing, e.g., in a muller type mixer, it can be extruded into blanks, e.g., from an auger type extrusion machine, and parts may be pressed from the extruded blanks by the porous die method. Fused silica-clay compositions which I have found useful for forming exhaust manifold parts are given in Table I. In these compositions, low alkali and alkaline earth containing clays were used so that the combined alkali and alkaline earth metal oxide impurity concentration did not exceed 0.3%.

TABLE I

Some Plasticized Fused Silica Compositions*

|  | R-41 | R-60 | R-69 | R-70 | R-71 | R-73 | R-74 | R-83 |
|---|---|---|---|---|---|---|---|---|
| (1)Fused silica, D and RG** | 35 | 18¾ | 20 | 30 | 30 | 21¼ | 32 | 20 |
| (1)Fused silica, 97% −325 mesh | 35 | 56¼ | 60 | 50 | 50 | 63¾ | 53 | 60 |
| (2)Jackson ball clay | — | 15 | 15 | 15 | 15 | 15 | 15 | — |
| (3)Ajax P jigger kaolin | 10 | 5 | 5 | 5 | — | — | — | 5 |
| (3)Velvacast kaolin | — | 2½ | — | — | 5 | — | — | — |
| (2)Mississippi M and D ball clay | — | 2½ | — | — | — | — | — | — |
| (2)Gem ball clay | — | — | — | — | — | — | — | 15 |
| (3)No. 6 Tile kaolin | 20 | — | — | — | — | — | — | — |
| (4)Propylene glycol alginate | 0.18 | 0.18 | 0.18 | 0.18 | 0.18 | 0.18 | 0.18 | 0.18 |
| Propylene glycol | 0.10 | 0.10 | 0.10 | 0.10 | 0.10 | 0.10 | 0.10 | 0.10 |
| Water | 24.3 | 21.5 | 23.0 | 23.0 | 23.0 | 22.5 | 22.5 | 23.0 |
| Wt % alkali and alkaline earth oxides impurity | 0.27 | 0.25 | 0.20 | 0.20 | 0.19 | 0.17 | 0.17 | 0.20 |

*Parts by weight
**97% −325 mesh material which has been wet ground (ball milled), dried and reground (pulverized).
(1)Glasrock Products, Inc.
(2)Kentucky-Tennessee Clay Co.
(3)Georgia Kaolin Co.
(4)Kelco Co., low alkali material.

I have discovered that very desirable material for exhaust manifold liners can be wet-pressed by the porous die procedure from nonplastic fused silica material if it is plasticized through limited use of clay containing very low amounts of alkali and alkaline earth metal impurities together with suitable auxiliary organic plasticizers and binders to provide workability so that complex reactor parts can be shaped and fabricated. These additives to ceramic fused silica have been selected so that in the resulting materials the essential physical characteristics of slip cast ceramic fused silica are retained and certain of the physical characteristics are improved or enhanced (insulation value and strength) for the thermal reactor application.

Aqueous solutions containing either hydroxyethyl cellulose, hydroxypropyl cellulose, ethylene oxide resin or propylene glycol alginate, singly or in combination, and, preferably but not essentially, used in conjunction with small amounts of propylene glycol or ethylene While Table I shows the plasticizer binder ingredient, propylene glycol aglinate, to be 0.18 parts by weight and the propylene glycol additive used to assist in the removal of the plasticizer on firing of the green pressed part to be 0.10 parts by weight, it should be understood that this is only by way of example and that the amount of such materials used can vary from 0.1 to 0.6 for the plasticizer binder and from 0.1 to 0.5 for the additive. Similarly, the amount of water used in forming the fused silica-clay mixture for extruding of blanks can vary from 20–28 parts by weight.

Table II lists the nominal compositions of the clays identified in Table I. Also, Table III sets forth the compositions by oxide content as listed in Table I. Unless otherwise identified, the amounts are in parts by weight. However, since the totals vary only fractionally from 100, the amounts may be viewed as fairly representing the percent by weight quantities.

TABLE II

Nominal Composition of Clays

|  | #6 Tile Clay | Ajax P Jigger | Jackson Ball Clay | Velvacast Kaolin | Mississippi M&D | Gem Ball Clay | Todd Light Ball Clay |
|---|---|---|---|---|---|---|---|
| $SiO_2$ | 46.9 | 45.20 | 54.40 | 45.42 | 57.26 | 54.87 | 57.54 |
| $Al_2O_3$ | 37.7 | 38.08 | 30.10 | 38.92 | 27.34 | 29.78 | 25.93 |
| $TiO_2$ | 1.4 | 1.52 | 1.60 | 1.43 | 1.32 | 1.60 | 1.34 |
| $Fe_2O_3$ | 0.3 | 0.49 | 0.86 | 0.34 | 2.33 | 0.99 | 1.19 |
| CaO | 0.3 | 0.26 | 0.36 | 0.24 | 0.47 | 0.36 | 0.51 |
| MgO | 0.4 | 0.30 | 0.34 | 0.18 | 0.52 | 0.31 | 0.71 |
| $K_2O$ | 0.1 | 0.04 | 0.32 | trace | 0.48 | 0.35 | 1.60 |
| $Na_2O$ | 0.2 | 0.02 | 0.07 | 0.11 | 0.13 | 0.10 | 0.42 |
| L.O.I. | 13.9 | 13.51 | 11.90 | 13.81 | 10.15 | 11.62 | 10.81 |
| TOTAL | 101.2 | 99.42 | 99.95 | 100.45 | 100.00 | 99.98 | 100.05 |

TABLE III

| | \multicolumn{8}{c}{Oxide Content of Compositions Listed in Table I} |
|---|---|---|---|---|---|---|---|---|
| | R-41 | R-60 | R-69 | R-70 | R-71 | R-73 | R-74 | R-83 |
| $SiO_2$ | 87.30 | 89.20 | 91.10 | 91.20 | 91.20 | 93.20 | 93.20 | 92.50 |
| $TiO_2$ | 0.45 | 0.37 | 0.32 | 0.32 | 0.32 | 0.25 | 0.25 | 0.33 |
| $Al_2O_3$ | 11.97 | 9.80 | 8.08 | 8.08 | 8.18 | 6.14 | 6.14 | 6.78 |
| $Fe_2O_3$ | 0.13 | 0.25 | 0.18 | 0.18 | 0.17 | 0.16 | 0.16 | 0.20 |
| CaO | 0.09 | 0.09 | 0.07 | 0.07 | 0.07 | 0.06 | 0.06 | 0.07 |
| MgO | 0.11 | 0.08 | 0.07 | 0.07 | 0.06 | 0.05 | 0.05 | 0.06 |
| $K_2O$ | 0.03 | 0.07 | 0.06 | 0.06 | 0.06 | 0.06 | 0.06 | 0.06 |
| $Na_2O$ | 0.05 | 0.02 | 0.02 | 0.02 | 0.02 | 0.02 | 0.02 | 0.02 |
| Total | 100.13 | 99.88 | 99.90 | 100.00 | 100.08 | 99.89 | 99.94 | 100.04 |
| % Fused Silica | 72.7 | 76.0 | 80.5 | 80.5 | 80.5 | 85.0 | 85.0 | 81.7 |
| % Alkali and Alkaline Earth Oxides | 0.27 | 0.25 | 0.20 | 0.20 | 0.19 | 0.17 | 0.17 | 0.20 |

As noted in Table I, the fused silica is very fine grained, one portion having been wet ground so that 97% passes through a 325 mesh screen, the remainder of the fused silica comprising the −325 mesh material after having been dried and reground to pulverized agglomerates.

Table IV

| | % Finer Than | | Average Particle Size | Surface Area |
|---|---|---|---|---|
| | 10μ | 2μ | μ | meters²/gram |
| D and RG fused silica | 77% | 32% | 2.0 | 9.0 |
| 97% −325 mesh fused silica | 39% | 8% | 4.5 | 2.2 |

Table IV shows the particle size and surface area characteristics for the two types of fused silica used by preference in my invention.

Also, it is noteworthy that typical commercial fused silica comprises, in weight percent, 99.6 silica, 0.2 alumina, 0.03 iron oxide, and 0.02 sodium and potassium oxides, the remainder being trace amounts of other constituents.

100% D and RG fused silica was tested rather than the mixture so as to obtain highest strength possible for the materials in Table I. The 100% D and RG material with organic plasticizers stuck to the pug mill parts and clogged that type extruder; however, the same 100% D and RG material worked satisfactorily in a small piston type extruder. The mixtures used, Table I, thus are a compromise to obtain extrudable material in an auger type pug mill or extruder. Also, drying of pressed parts was easier with the mixtures due to the presence of the coarser particles of fused silica. 100% wet ground −325 mesh fused silica may also be used.

While I have indicated the sources of the materials used in my experiments, other sources may be used, more particularly, fused silica of comparable purity would work if ground similarly to the D and RG and 97% −325 mesh material and other clays may be used provided the total alkali and alkaline earth metals content is less than 0.3 weight percent.

It should also be noted that fused silica is an amorphous material which results when crystalline silica is melted and cooled fairly rapidly. The coefficient of thermal expansion for commercially available fused silica will be less than $0.8 \times 10^{-6}$ in/in/°C. in the 20°–800° C. range. As distinguished from this, crystalline silicas have substantially larger thermal expansion coefficients and are subject to the quartz, tridymite and cristobalite transformations during heating and cooling with abrupt changes in thermal expansion because of the transformations.

Also as noted in Table V, I have found that when 0.3% total alkali, and alkaline earth metals was exceeded, cristobalite formation began to exceed desirable limits in both the material as sintered as well as in reheated sintered material with resultant high thermal expansion and abrupt changes in thermal expansion.

Table V

| | R-18 | R-7 | R-17 |
|---|---|---|---|
| % 97% −325 mesh fused silica | 85 | 40 | 60 |
| % D and RG fused silica | — | 40 | 20 |
| % Todd Light ball clay | 15 | 15 | 20 |
| % Velvacast kaolin | — | 5 | — |
| Thermal expansion coefficient $10^{-6}$ in/in/°C. - 20-800° C. | 4.29 | 4.84 | 4.58 |
| % alkali and alkaline earth oxide | 0.49 | 0.51 | 0.66 |

Table VI below lists the physical characteristics for the compositions of my invention and it is readily seen that the coefficient of thermal expansion is substantially less than that for compositions containing more than 0.3% alkali and alkaline earth metal oxides.

TABLE VI

| | \multicolumn{8}{c}{Physical Characteristics of Fused Silica-Clay Compositions} |
|---|---|---|---|---|---|---|---|---|
| | R-41 | R-60 | R-69 | R-70 | R-71 | R-73 | R-74 | R-83 |
| Specific Gravity, gms/cm³ | 1.698 | 1.707 | 1.765 | 1.792 | 1.747 | 1.741 | 1.709 | 1.747 |
| Apparent Porosity, % | 27.2 | 26.1 | 23.0 | 21.9 | 24.0 | 23.2 | 24.7 | 23.7 |
| Flexural Strength, kPa | 24.7 | 29.0 | 31.4 | 37.7 | 30.7 | 32.7 | 33.2 | 28.4 |
| Thermal Expansion, $10^{-6}$ in/in/°C. 20°-800° C. | 1.11 | 1.22 | 0.98 | 1.06 | 1.16 | 0.97 | 0.95 | 1.30 |
| Cristobalite, % as sintered | trace | trace | trace | trace | trace | trace | trace | trace |
| Cristobalite, % after 1123° C. - 6 hrs. reheat | 1.2 | 0.5 | 1.2 | 1.4 | 0.8 | 0.3 | 0.2 | trace |
| Thermal Shock Resistance % Change in Flexural Strength (after 10 cycles at 1000° C.- | | | | | | | | |

TABLE VI-continued

| Physical Characteristics of Fused Silica-Clay Compositions | | | | | | | | |
|---|---|---|---|---|---|---|---|---|
| | R-41 | R-60 | R-69 | R-70 | R-71 | R-73 | R-74 | R-83 |
| room temperature) | −3 | +9 | +7 | −6 | — | +8 | +9 | +3 |

I have also experimented with compositions consisting of only fused silica, 100% silica without clay, and with the water, organic plasticizers and additives in amounts as identified above for mixtures with clay. I find that this composition is impractical for anything other than flat tiles or small parts of simple configurations not highly contoured as in the case of an exhaust manifold reactor liner. In the case of such contoured parts, porous plaster dies break after a few pressings, this being unacceptable in any high production operation. This occurs because the water content of the composition is removed very quickly making the pressing of cohesive green parts very difficult and requiring much higher pressures than required by the clay containing compositions.

By way of preferred example, in forming a reactor liner the composition identified as R-70 was made-up and extruded in an auger type extruder, blanks of the desired amount being cut from the extruded log to enable pressing in the wet process porous die press described above. It should be noted that though preferred, it is not essential that the mixed composition be extruded prior to pressing, it being only necessary that the constituents be well mixed to form a substantially homogeneous batch.

After a suitable short conditioning period to develop firmness after forming, during which the pressed parts shrink about 1%, the parts are joined together with slip made from the same composition after roughening the joint surfaces of each part to be assembled together. The slip joined fused silica or fused silica-clay liners are dried and then sintered at 1123° C. for 6 hours in an oxidizing atmosphere of air or natural gas combustion products; either atmosphere should contain about 27% water vapor for best strength development. After sintering, the already assembled reactor liners are ground to size where needed with suitable, i.e., silicon carbide or diamond tools, and then assembled with fibrous insulation into the outer metal containers of the reactor.

From the foregoing description, it is apparent that I have provided the necessary compositions and a method for pressing highly contoured fused silica parts so as to be usable in high volume production operations without loss of physical properties of high strength, insulation value based on increased porosity, and thermal shock resistance, this latter retention characteristic resulting from the low coefficient of thermal expansion possible by reason of lack of cristobalite in the fused silica, the principal constituent in the composition. The scope of my invention is as described and as set forth in the claims which follow.

What is claimed is:

1. In a method for low pressure forming a contoured refractory body having fused silica as its principal ingredient with resulting low coefficient of thermal expansion, the steps of mixing fused silica of −325 mesh size in the amount of about 70 to 85 parts by weight with clay in the amount of about 15 to 30 parts by weight, deionized water in the amount of about 20 to 28 parts by weight and from about 0.1 to 0.6 parts by weight of one or more of the organic plasticizers selected from the group consisting of hydroxyethyl cellulose, hydroxypropyl cellulose, ethylene oxide resin, propylene glycol alginate, said constituents being intermixed to form a substantially homogeneous batch containing less than 0.3% by weight on an after-fired basis of alkali and alkaline earth metal oxides, pressing blanks of the desired size at a low pressure not in excess of 1500 psia in a porous die press, removing the formed shape from said press, drying said formed shape and sintering said formed shape at a temperature of about 1123° C. for a period of about 6 hours, the low coefficient of thermal expansion of fused silica being substantially retained by said limitation of the total amount of alkali and alkaline earth metal oxide content.

2. In a method for low pressure forming a contoured refractory body having fused silica as its principal ingredient with resulting low coefficient of thermal expansion, the steps of mixing fused silica of −325 mesh in the amount of about 70 to 85 parts by weight with clay in the amount of about 15 to 30 parts by weight, deionized water in the amount of about 20 to 28 parts by weight and from about 0.1 to 0.6 parts by weight of one or more of the organic plasticizers selected from the group consisting of hydroxyethyl cellulose, hydroxypropyl cellulose, ethylene oxide resin, propylene glycol alginate, said constituents being intermixed to form an extrudable batch containing less than 0.3% by weight on an after-fired basis of alkali and alkaline earth metal oxides, extruding said batch into blanks of the desired size, pressing said blanks in a porous die at a pressure of not exceeding about 1500 psia, removing the formed body from said press, drying said formed body and sintering said dried body at a temperature of about 1123° C. for a period of about 6 hours, the low coefficient of thermal expansion of fused silica being substantially retained by said limitation of the total amount of alkali and alkaline earth metal oxide content and said body having good insulating and thermal shock resistance properties as well as high strength.

3. A method in accordance with claim 2 wherein the amount of fused silica is about 72.7 parts by weight, the balance to 100 parts being clay, and wherein the plasticizer is used in an amount of about 0.2 parts by weight, and including an additive in the amount of 0.1 to 0.5 parts by weight to aid in removal of said plasticizer on firing, said additive being selected from the group consisting of propylene glycol and ethylene glycol.

4. A method in accordance with claim 3 wherein the fused silica is about 80.5 parts by weight.

5. A method in accordance with claim 3 wherein the fused silica is about 85 parts by weight.

6. An insulating porous fused silica-clay contoured body formed in accordance with the method set forth in claim 1.

7. An insulating porous fused silica-clay contoured body formed in accordance with the method set forth in claim 2.

8. An insulating porous fused silica-clay contoured body formed in accordance with the method set forth in claim 3.

9. An insulating porous fused silica-clay contoured body formed in accordance with the method set forth in claim 4.

10. An insulating porous fused silica-clay contoured body formed in accordance with the method set forth in claim 5.

* * * * *